No. 664,586. Patented Dec. 25, 1900.
C. SAXTON.
CASTOR BEAN POPPING HOUSE.
(Application filed Mar. 15, 1900.)
(No Model.)
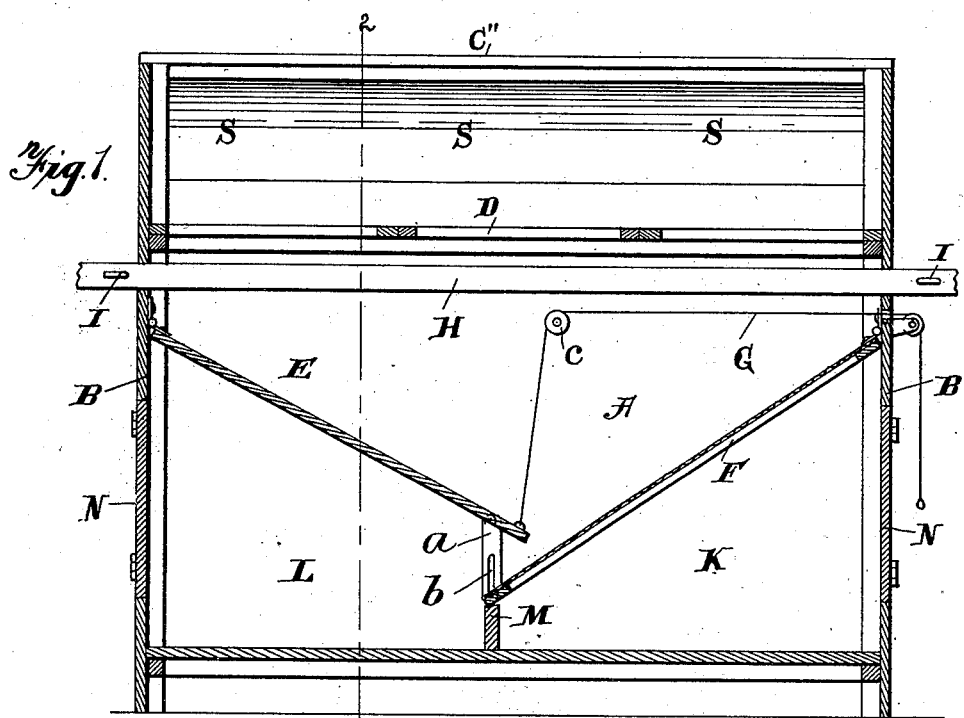
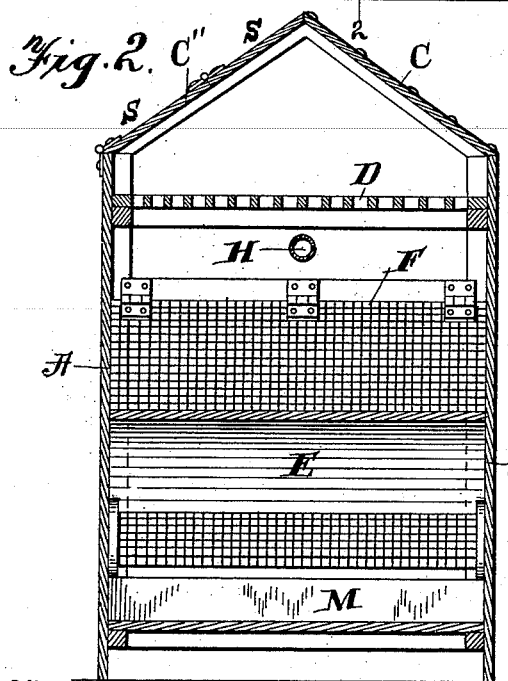
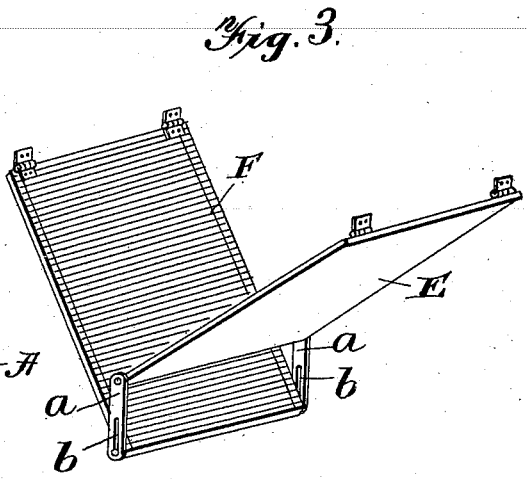
Witnesses
Geo. E. Frech.
E. C. Hunter.
Inventor
Chester Saxton
by
S. H. Evans, Attorney

UNITED STATES PATENT OFFICE.

CHESTEEN SAXTON, OF PAYNE COUNTY, OKLAHOMA TERRITORY.

CASTOR-BEAN-POPPING HOUSE.

SPECIFICATION forming part of Letters Patent No. 664,586, dated December 25, 1900.

Application filed March 15, 1900. Serial No. 8,832. (No model.)

*To all whom it may concern:*

Be it known that I, CHESTEEN SAXTON, a citizen of the United States, residing in the county of Payne, in the Territory of Oklahoma, have invented certain new and useful Improvements in Castor-Bean-Popping Houses, of which the following is a specification.

My invention relates to improvements in castor-bean-popping houses, all of which will be fully described hereinafter, and particularly referred to in the claims.

The object of my invention is to provide a castor-bean popper in which the beans may be delivered to the house from a wagon and thrown in the top thereof upon a popping-grate, and the beans when popped in falling from their shells will fall through the grate and be separated from the shells, the shells going into one compartment and the beans into another.

In the accompanying drawings, Figure 1 is a vertical central longitudinal sectional view of a castor-bean popper embodying my invention. Fig. 2 is a central cross-sectional view on the line 2 2 of Fig. 1. Fig. 3 is a detached perspective view of the hinged deflector and sieve.

Referring now to the drawings, A indicates the sides of my popping-house, and B the ends. The top C is divided in the center, one side being nailed fast and the other side C'' being divided into longitudinal sections S, whereby it may be opened more or less for the purpose of admitting thereto the beans to be popped from a wagon driven alongside of the house.

Situated within the upper portion of the house is a popping-grate D, which is suitably supported and made into as many sections as may be desired for the purpose of enabling it to be readily removed from the house, the number of sections varying according to the size of the house, as will be readily understood.

Situated within the house and below the popping-grate is a deflector E, the said deflector being suitably hinged at its outer end to the end of the house. This deflector extends downwardly at an inclination about half-way the length of the house, and situated in the other end of the house is an inclined sieve F, which has its inner end to project under and beyond the inner end of the deflector. The sieve has its outer end also suitably hinged to the inner side of the opposite end of the popping-house, and the sieve and the deflector are free to be raised and lowered as desired. The inner free ends of the sieve and the deflector are connected by means of the links $a$ being pivotally connected with the lower end of the deflector and the lower ends of the links being provided with slots $b$, through which suitable pivotal pins pass into the inner and free end of the sieve. Connected to the deflector and projecting upward and through the house and over suitable rollers or guides $c$ are the supporting-cords G. These cords extend outside of the house and are adapted to be operated for the purpose of raising or lowering the deflector and the deflector being in turn connected with the sieve, the sieve being correspondingly raised and lowered, whereby the inclination of the sieve and deflector may be varied at will as desired, and it will be noted that the sieve and the deflector are kept a suitable distance apart by means of the links before referred to.

Passing longitudinally through the house at a point below the popping-grate is a suitable heating-pipe H, there being connected with one end any desired heating apparatus or stove, and situated within this pipe at each end of the house will be a damper I, one adapted to retain the heat within the house and the other to cut it out, as will be readily understood.

For the purpose of dividing the house into two compartments K and L, I provide a suitable partition M, located at the lower end of the sieve, and this partition is suitably supported within the house in any desired manner.

Each end of the house below the outer end of the deflector and also below the outer end of the sieve is provided with suitable doors N for the purpose of allowing access thereto.

In the operation of my castor-bean popper the beans are placed upon the popping-grate and the heat turned on. The beans beginning to pop fall from their shells, and the fragments of the shells and the beans fall downward against the deflector and the sieve, those falling against the deflector being directed against the sieve, and the sieve is of such mesh that the beans will fall therethrough into the compartment K, and the hulls will fall into the compartment L to be separately removed from the house.

Having thus described my invention, what I claim, and desire to secure by Letters Patent, is—

1. A castor-bean popper comprising a case having in its upper portion a popping-grate, a heating means for the said grate, and a separating means below said grate, substantially as described.

2. A castor-bean popper comprising a case or housing having in its upper portion a popping-grate, a heater extending through the said house, below the grate, and bean and shell separating devices, situated below the heater and the popping-grate, substantially as described.

3. A castor-bean popper comprising a housing having in its upper portion a popping-grate, a heater extending through the house below the grate, an inwardly-inclined sieve below the heater and popping-grate, and an oppositely-inclined deflector above the said sieve and adapted to direct the hulls against the sieve for separation, substantially as described.

4. A castor-bean popper comprising a housing, a popping-grate situated in its upper portion, a heater situated below the grate, an inwardly-inclined sieve situated in one end of the housing below the heater and grate, a partition dividing the lower portion of the house into two chambers, and an inclined deflector situated in the opposite end of the house below the grate and above the said sieve, substantially as described.

5. A castor-bean popper comprising a housing, a popping-grate in the upper portion thereof, a movable top therefor, permitting access to the popping-grate, a heater located in the house below the said grate, and a separating means situated below the heater and the grate for separating the beans and the shells, substantially as described.

6. A castor-bean popper comprising a housing, a popper-grate situated in the upper portion thereof, a heater-pipe extending through the said housing, the said pipe having dampers for controlling the passage of the heat therethrough, an inclined sieve situated in one end of the housing below the said pipe, a partition dividing the housing into bean and shell chambers, and an inclined deflector in the opposite end of the housing, situated above the sieve and below the heating-pipe, substantially as described.

In testimony whereof I affix my signature in presence of two witnesses.

CHESTEEN SAXTON.

Witnesses:
W. H. MATTHEWS,
L. MARKS.